(12) United States Patent
Numajiri et al.

(10) Patent No.: US 7,745,951 B2
(45) Date of Patent: Jun. 29, 2010

(54) WIND TURBINE GENERATOR

(75) Inventors: Tomohiro Numajiri, Nagasaki (JP);
Yoshihiko Hayashi, Nagasaki (JP)

(73) Assignee: Mitsubishi Heavy Industries, Ltd. (JP)

( * ) Notice: Subject to any disclaimer, the term of this patent is extended or adjusted under 35 U.S.C. 154(b) by 0 days.

(21) Appl. No.: 12/444,638

(22) PCT Filed: Apr. 24, 2008

(86) PCT No.: PCT/JP2008/057958

§ 371 (c)(1),
(2), (4) Date: Apr. 7, 2009

(87) PCT Pub. No.: WO2008/146559

PCT Pub. Date: Dec. 4, 2008

(65) Prior Publication Data

US 2010/0032960 A1    Feb. 11, 2010

(30) Foreign Application Priority Data

May 25, 2007    (JP)    ............... 2007-139433

(51) Int. Cl.
*F03D 9/00*    (2006.01)
*H02P 9/04*    (2006.01)
*F03B 11/00*    (2006.01)
*F04D 29/36*    (2006.01)
*B64C 27/00*    (2006.01)

(52) U.S. Cl. .............. 290/55; 416/146 A; 416/147; 416/132 B; 416/235; 416/236 A; 416/247 R; 52/12

(58) Field of Classification Search ............ 290/55; 52/12; 416/132 B, 235, 236 A, 247 R, 146 A, 416/147
See application file for complete search history.

(56) References Cited

U.S. PATENT DOCUMENTS 3,053,491 A * 9/1962 Ramser .................. 248/48.2
4,493,588 A * 1/1985 Duffy ..................... 405/119
4,497,146 A * 2/1985 Demartini .................. 52/12

(Continued)

FOREIGN PATENT DOCUMENTS

DE    102007032937 A1 *  1/2009

(Continued)

OTHER PUBLICATIONS

ISR for PCT/JP2008/057958 mailed Jun. 17, 2008.

*Primary Examiner*—T C Patel
*Assistant Examiner*—Pedro J Cuevas
(74) *Attorney, Agent, or Firm*—Kanesaka Berner & Partners, LLP

(57) ABSTRACT

A wind turbine generator that can eliminate the penetration of rainwater and prevent the occurrence of failure is provided. The wind turbine generator includes: a plurality of wind-turbine rotor blades for receiving wind power; a rotor head to which the plurality of wind-turbine rotor blades are attached, the rotor head being rotated and driven by the wind power received by the plurality of wind-turbine rotor blades; a head capsule for covering the rotor head; a blade-side disc portion that extends from each wind-turbine rotor blade radially outward of the wind-turbine rotor blade and is inclined toward the head capsule; a cylindrical portion that is disposed substantially coaxial with each wind-turbine rotor blade and extends from the head capsule toward the tip of the wind-turbine rotor blade; a capsule-side disc portion extending radially outward from each cylindrical portion; and a bent portion that extends radially outward from the outer circumferential edge of each capsule-side disc portion and is inclined toward the tip of the wind-turbine rotor blade.

4 Claims, 4 Drawing Sheets

U.S. PATENT DOCUMENTS

| | | | | |
|---|---|---|---|---|
| 4,571,896 A * | 2/1986 | Condie | | 52/12 |
| 4,757,649 A * | 7/1988 | Vahldieck | | 52/12 |
| 5,016,404 A * | 5/1991 | Briggs | | 52/12 |
| 5,078,290 A * | 1/1992 | Ochs | | 215/276 |
| 5,099,620 A * | 3/1992 | Carey | | 52/12 |
| 5,261,196 A * | 11/1993 | Buckenmaier et al. | | 52/94 |
| 5,497,583 A * | 3/1996 | Rhoads | | 52/12 |
| 5,557,891 A * | 9/1996 | Albracht | | 52/12 |
| 5,588,261 A * | 12/1996 | MacConochie | | 52/11 |
| 5,660,001 A * | 8/1997 | Albracht | | 52/12 |
| 5,737,879 A * | 4/1998 | Sweet | | 52/12 |
| 5,852,900 A * | 12/1998 | Edelman | | 52/12 |
| 5,911,659 A * | 6/1999 | Serano | | 52/12 |
| 6,073,398 A * | 6/2000 | Williams | | 52/12 |
| 6,098,344 A * | 8/2000 | Albracht | | 52/12 |
| 7,104,012 B1 * | 9/2006 | Bayram | | 52/12 |
| 7,448,167 B2 * | 11/2008 | Bachman | | 52/12 |
| 7,594,800 B2 * | 9/2009 | Teipen | | 416/247 R |
| 7,658,595 B2 * | 2/2010 | Podgurski | | 416/168 R |
| 2005/0212300 A1 | 9/2005 | Kimura et al. | | 290/55 |
| 2007/0212224 A1* | 9/2007 | Podgurski | | 416/134 A |
| 2008/0025847 A1* | 1/2008 | Teipen | | 416/244 R |
| 2009/0060748 A1* | 3/2009 | Landa et al. | | 416/93 R |
| 2009/0317254 A1* | 12/2009 | Numajiri et al. | | 416/147 |
| 2010/0028152 A1* | 2/2010 | Numajiri et al. | | 416/146 R |
| 2010/0031583 A1* | 2/2010 | Chang | | 52/12 |
| 2010/0034658 A1* | 2/2010 | Numajiri et al. | | 416/204 R |
| 2010/0043227 A1* | 2/2010 | Numajiri | | 29/889 |

FOREIGN PATENT DOCUMENTS

| | | | |
|---|---|---|---|
| JP | 2002-130109 A | | 5/2002 |
| JP | 2007-032420 A | | 2/2007 |
| JP | 2008291788 A | * | 12/2008 |
| WO | 03/074868 A1 | | 9/2003 |

* cited by examiner

WIND TURBINE GENERATOR

RELATED APPLICATIONS

The present application is based on International Application Number PCT/JP2008/57958 filed Apr. 24, 2008, and claims priority from Japanese Application Number 2007-139433 filed Apr. 24, 2008, the disclosures of which are hereby incorporated by reference herein in their entirety.

TECHNICAL FIELD

The present invention relates to a wind turbine generator.

BACKGROUND ART

In recent years, wind turbine generators using wind power are attracting attention as apparatuses for generating power using clean energy (for example, refer to Patent Document 1).

As an example of the above-described wind turbine generators, a wind turbine generator including a plurality of wind-turbine rotor blades rotated by wind power and a rotor head to which the wind-turbine rotor blades are attached is known.

The wind-turbine rotor blades include fixed-pitch-type wind-turbine rotor blades that are fixed to the rotor head and have a fixed pitch and variable-pitch-type wind-turbine rotor blades whose pitch is varied according to the wind speed. The type is selected according to the conditions of use.

Variable-pitch-type wind-turbine rotor blades typically have gaps between a head capsule for covering the rotor head and the wind-turbine rotor blades to change the pitch.

Patent Document 1: Japanese Unexamined Patent Application, Publication No. 2007-32420

DISCLOSURE OF INVENTION

As described above, when the variable-pitch type is employed, gaps are provided between the head capsule and the wind-turbine rotor blades. Thus, there is a problem in that rainwater penetrates into the head capsule through the gaps.

The head capsule accommodates the rotor head having a mechanism composed of an iron-and-steel member, such as a variable mechanism for varying the pitch of the wind-turbine rotor blades. Therefore, if rainwater penetrates into the head capsule, such a mechanism is made wet by the rainwater and becomes susceptible to rust, possibly causing failure.

Furthermore, some wind turbine generators these days accommodate an electronic device and the like in their head capsules. There is also a problem in that if rainwater penetrates into the head capsule of such a wind turbine generator, the electronic device fails due to short-circuiting etc.

The present invention has been made to solve the above-described problems, and an object thereof is to provide a wind turbine generator that can eliminate the penetration of rainwater and prevent the occurrence of failure.

To achieve the above-described object, the present invention provides the following solutions.

The present invention provides a wind turbine generator including: a plurality of wind-turbine rotor blades for receiving wind power; a rotor head to which the plurality of wind-turbine rotor blades are attached, the rotor head being rotated and driven by the wind power received by the plurality of wind-turbine rotor blades; a head capsule for covering the rotor head; a blade-side disc portion that extends radially outward of each wind-turbine rotor blade from the wind-turbine rotor blade and is inclined toward the head capsule; a cylindrical portion that is disposed substantially coaxial with each wind-turbine rotor blade and extends from the head capsule toward the tip of the wind-turbine rotor blade; a capsule-side disc portion extending from each cylindrical portion radially outward of the wind-turbine rotor blade; and a bent portion that extends radially outward from the outer circumferential edge of each capsule-side disc portion and is inclined toward the tip of the wind-turbine rotor blade.

According to the present invention, the water running down the wind-turbine rotor blade from the wind-turbine rotor blade to the head capsule runs from the wind-turbine rotor blade along the blade-side disc portion and drops on the head capsule via the blade-side disc portion. At this time, because the blade-side disc portion is inclined toward the head capsule, the water smoothly runs radially outward and drops on the head capsule.

On the other hand, the water running down the head capsule from the head capsule toward the wind-turbine rotor blade runs from the head capsule along the cylindrical portion and the capsule-side disc portion and drops on the outside of the blade-side disc portion.

Furthermore, the water splashed from the head capsule toward a gap between the blade-side disc portion and the capsule-side disc portion collides with the bent portion and runs along the bent portion and drops on the outside of the blade-side disc portion. Because the bent portion extends radially outward further than the blade-side disc portion, the water is more reliably guided to the outside of the blade-side disc portion.

Accordingly, rainwater is prevented from flowing into the gap between the wind-turbine rotor blade and the head capsule.

In the above-described invention, it is preferable that each capsule-side disc portion extend radially outward from the blade-side disc portion and be inclined toward the head capsule.

This allows the water running down the head capsule from the head capsule toward the wind-turbine rotor blade to run from the head capsule along the cylindrical portion and the capsule-side disc portion, where the water is temporarily trapped, and drop on the outside of the blade-side disc portion. At this time, the water remaining between the head capsule and the capsule-side disc portion runs down from the cylindrical wall to the head capsule when the head capsule is rotated to reverse the top and bottom.

In the above-described invention, it is preferable that each bent portion extend, at least, to a position where it abuts a tangent line extending from the head capsule to a gap between the blade-side disc portion and the capsule-side disc portion.

This further ensures that the water splashed from the head capsule toward the gap between the blade-side disc portion and the capsule-side disc portion collides with the bent portion.

Accordingly, the water is more reliably prevented from flowing into the gap between the wind-turbine rotor blade and the head capsule.

The wind turbine generator of the present invention has an advantage in that it provides a wind turbine generator that can eliminate the penetration of rainwater and prevent the occurrence of failure.

EXPLANATION OF REFERENCE SIGNS

Figure 1:
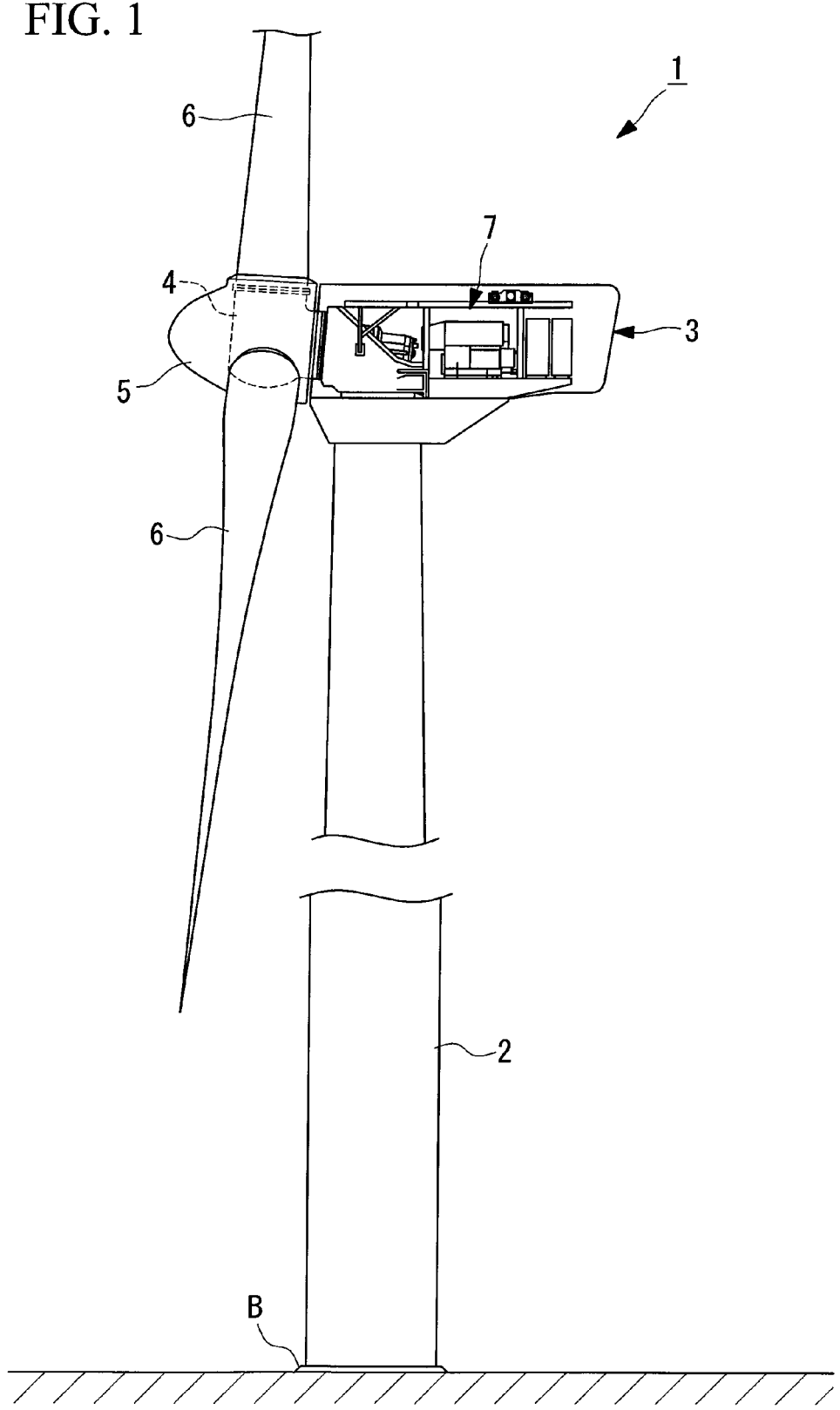
FIG. 1 is a diagram showing the structure of a wind turbine generator according to a first embodiment of the present invention.

1: wind turbine generator
4: rotor head
5: head capsule
6: wind-turbine rotor blade
22: cylindrical portion
23: capsule-side disc portion
24: bent portion
31: blade-side disc portion

BEST MODE FOR CARRYING OUT THE INVENTION

Referring to FIGS. 1 to 4, a wind turbine generator according to an embodiment of the present invention will be described.

FIG. 1 is a diagram showing the structure of a wind turbine generator according to this embodiment.

As shown in FIG. 1, a wind turbine generator 1 performs wind power generation. The wind turbine generator 1 includes a tower 2 installed upright on a foundation B, a nacelle 3 mounted on the top of the tower 2, a rotor head 4 mounted to the nacelle 3 so as to be rotatable about a substantially horizontal axis, a head capsule 5 for covering the rotor head 4, a plurality of wind-turbine rotor blades 6 radially attached around the rotation axis of the rotor head 4, and a power generating unit 7 for generating power by rotation of the rotor head 4.

Although this embodiment will be described as applied to an example in which three wind-turbine rotor blades 6 are provided, the number of the wind-turbine rotor blades 6 is not limited to three, but may be two or more than three; it is not specifically limited.

As shown in FIG. 1, the tower 2 has a columnar structure extending upward (upward in FIG. 1) from the foundation B, and has a structure in which, for example, a plurality of units are connected in the vertical direction. The nacelle 3 is mounted on the top of the tower 2. When the tower 2 consists of a plurality of units, the nacelle 3 is mounted on the top unit.

As shown in FIG. 1, the nacelle 3 rotatably supports the rotor head 4 and accommodates the power generating unit 7 for generating power by rotation of the rotor head 4.

Figure 2:
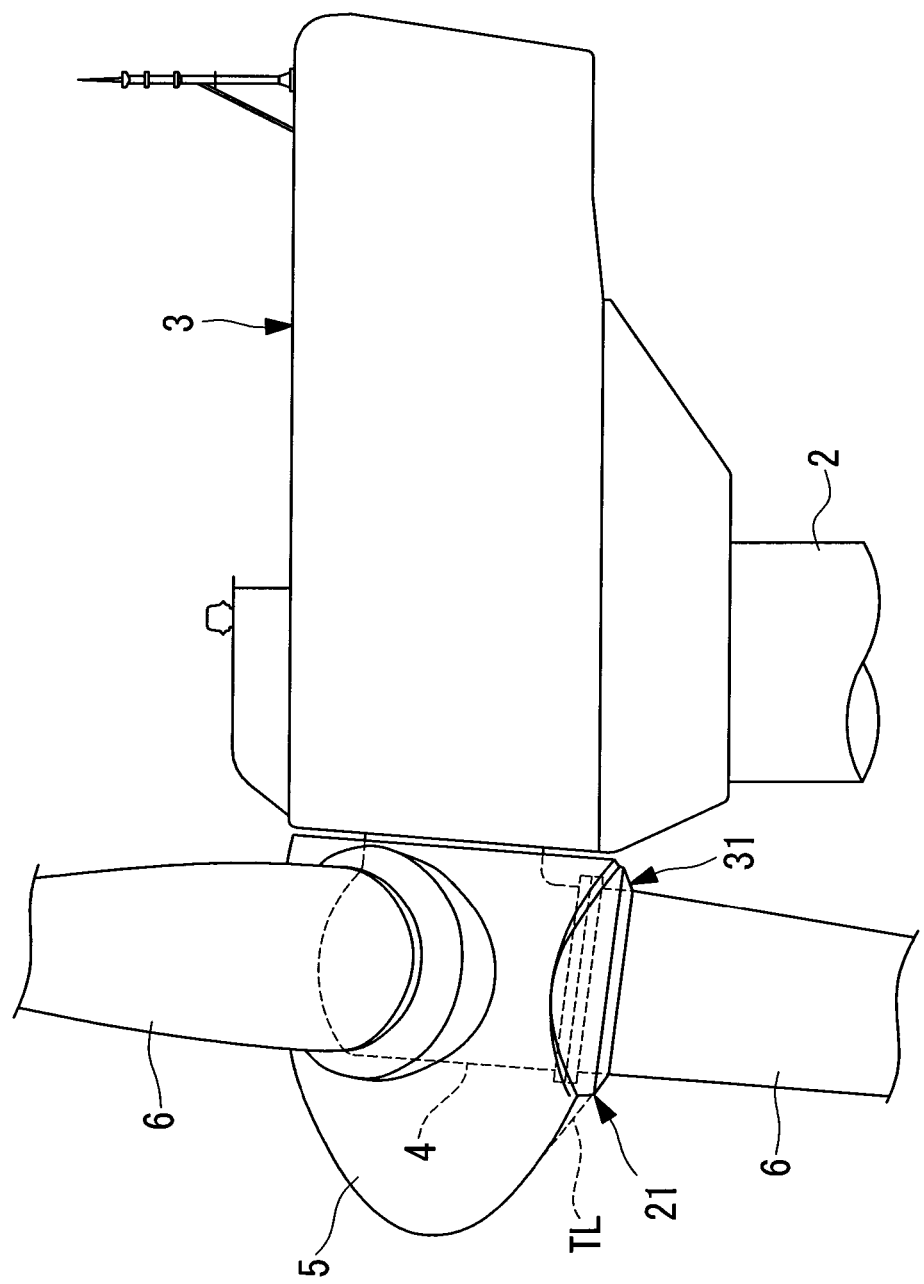
FIG. 2 is a partial enlarged view showing the structure of the rotor head in FIG. 1.

FIG. 2 is a partial enlarged view showing the structure of the rotor head in FIG. 1.

As shown in FIGS. 1 and 2, the plurality of wind-turbine rotor blades 6 are attached to the rotor head 4, radially around the rotation axis, and the periphery of the rotor head 4 is covered by the head capsule 5.

The rotor head 4 has a pitch control unit (not shown) that rotates the wind-turbine rotor blades 6 about the axis of the wind-turbine rotor blades 6 and changes the pitch angle of the wind-turbine rotor blades 6.

Thus, when the wind strikes the wind-turbine rotor blades 6 from the rotation axis direction of the rotor head 4, the wind-turbine rotor blades 6 generate force to rotate the rotor head 4 about the rotation axis. As a result, the rotor head 4 is rotated and driven.

Figure 3:
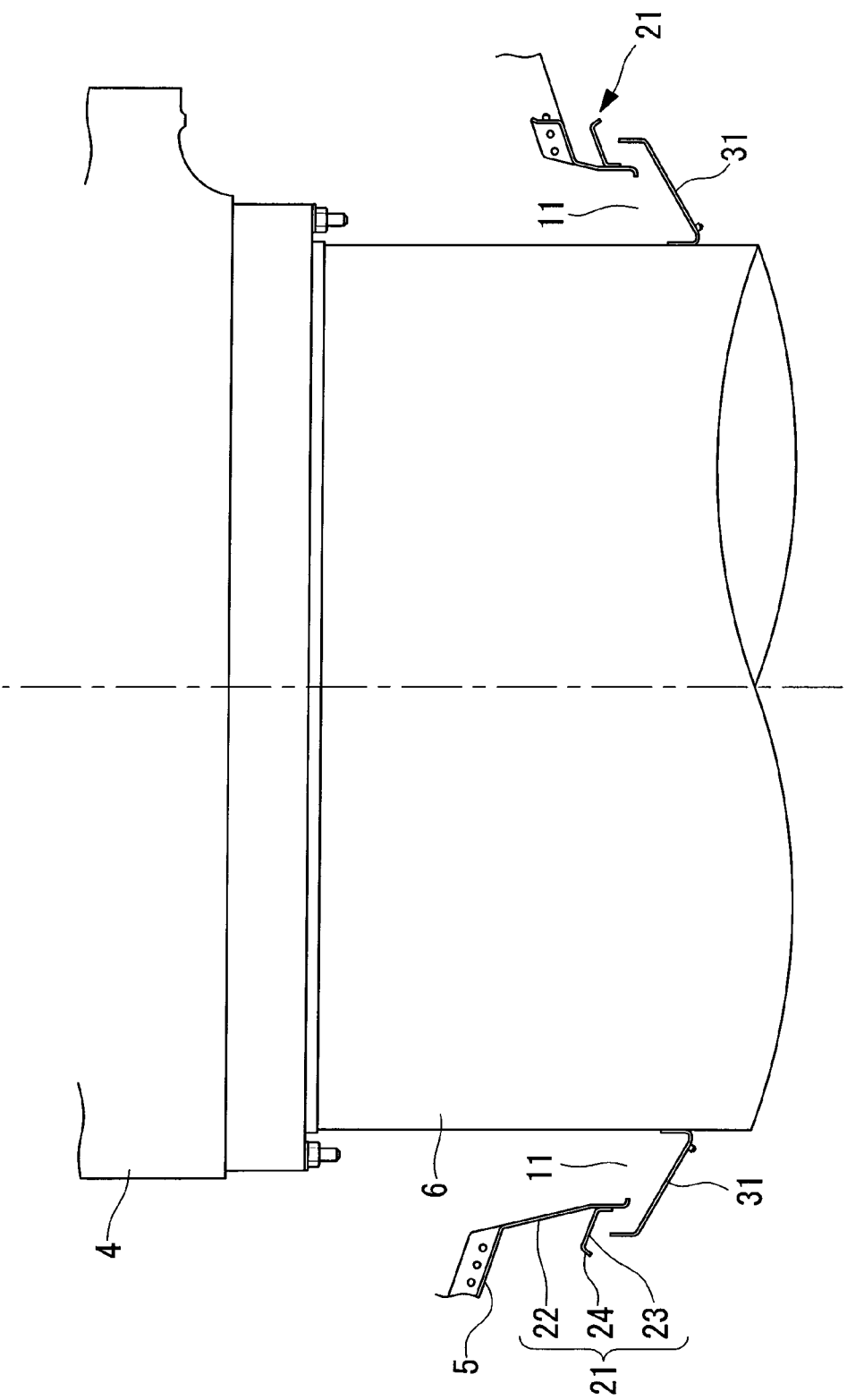
FIG. 3 is a partial enlarged view showing the structures of a head capsule and a base of a wind-turbine rotor blade in FIG. 1.

FIG. 3 is a partial enlarged view showing the structures of the head capsule and a base of the wind-turbine rotor blade in FIG. 1.

As shown in FIGS. 2 and 3, the head capsule 5 covers the rotor head 4 and rotates together with the wind-turbine rotor blades 6 and the rotor head 4 about substantially the horizontal axis. The head capsule 5 has openings 11 for disposing the wind-turbine rotor blades 6. A capsule-side waterproof portion 21, which, together with a blade-side disc portion 31, prevents rainwater from penetrating into the head capsule, is provided around each of the openings 11.

Figure 4:
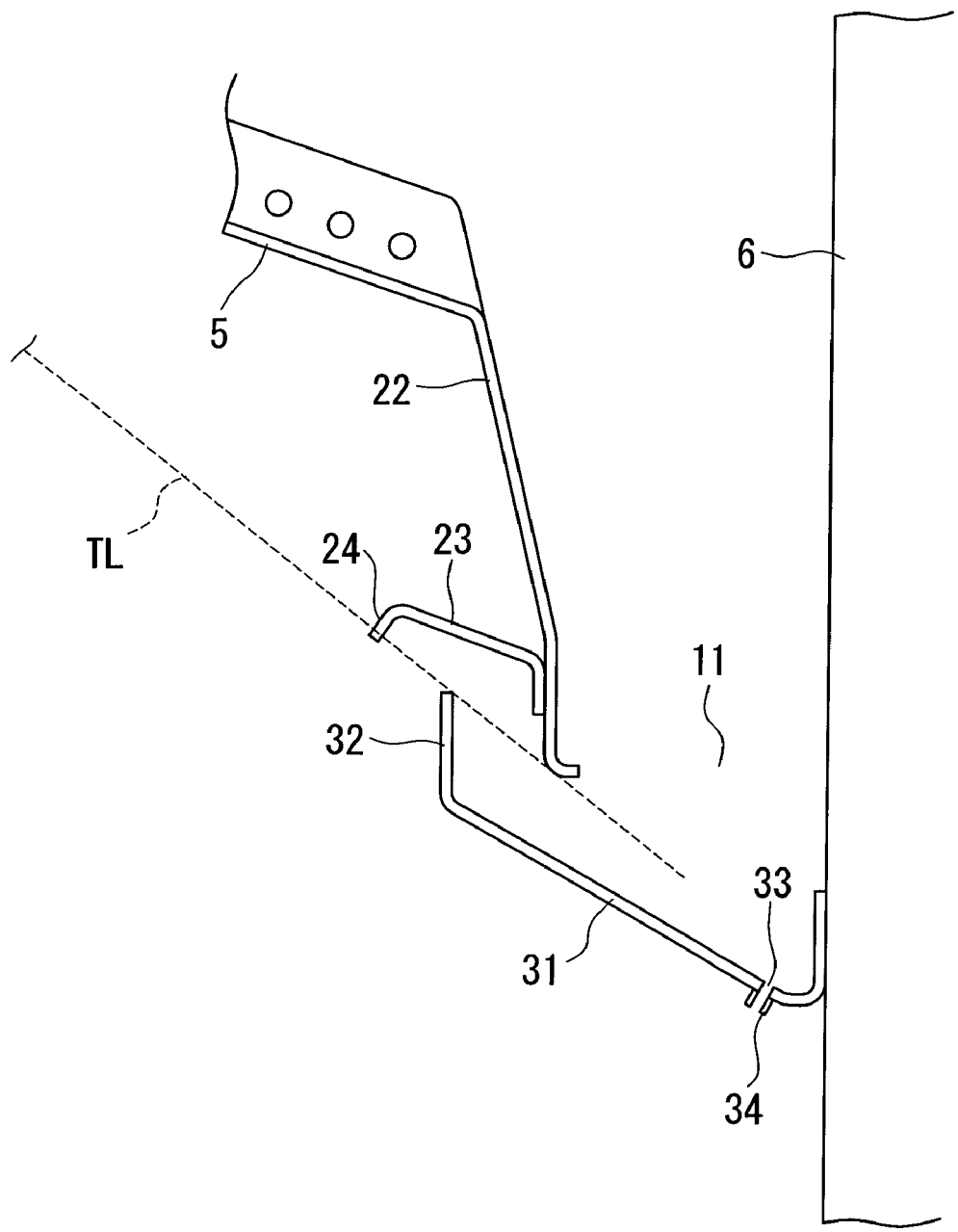
FIG. 4 is a partial enlarged view showing the structures of a capsule-side waterproof portion and a blade-side waterproof portion in FIG. 3.

FIG. 4 is a partial enlarged view showing the structures of the capsule-side waterproof portion and the blade-side waterproof portion in FIG. 3.

As shown in FIG. 4, the capsule-side waterproof portion 21 includes a cylindrical portion 22 that is substantially coaxial with the axis of the wind-turbine rotor blade 6 and extends from the opening 11 toward the tip of the wind-turbine rotor blade 6, a capsule-side disc portion 23 extending radially outward from the cylindrical portion 22, and a bent portion 24 extending radially outward from the outer circumferential edge of the capsule-side disc portion 23.

As shown in FIG. 4, the diameter of the cylindrical portion 22 is selected so as to be larger than the diameter of the wind-turbine rotor blade 6 at a position corresponding to the cylindrical portion 22 and so as to be smaller than the diameter of the outer circumferential edge of the blade-side disc portion 31 described below. The capsule-side disc portion 23 is disposed near the end of the cylindrical portion 22 at the tip of wind-turbine rotor blade 6.

The capsule-side disc portion 23 is a ring-plate shaped member extending radially outward from the outer circumferential surface of the cylindrical portion 22, whose outer circumferential edge extends radially outward further than the outer circumferential edge of the capsule-side disc portion 23. Furthermore, the capsule-side disc portion 23 is inclined toward the rotor head 4 in the radially outward direction.

The bent portion 24 is a ring-plate shaped member extending radially outward from the outer circumferential edge of the capsule-side disc portion 23 and is inclined toward the tip of the wind-turbine rotor blade 6 in the radially outward direction.

The outer circumferential edge of the bent portion 24 extends, at least, to a tangent line TL of the head capsule 5 extending between the cylindrical portion 22 and the blade-side disc portion 31.

As shown in FIG. 4, the blade-side disc portion 31, together with the capsule-side waterproof portion 21, prevents rainwater from entering the head capsule 5.

The blade-side disc portion 31 is a ring-plate shaped member extending radially outward from the outer circumferential surface of the wind-turbine rotor blade 6 and is inclined toward the rotor head 4 in the radially outward direction. Furthermore, a cylindrical surface 32 extending toward the rotor head 4 is formed at the outer circumferential edge of the blade-side disc portion 31.

The blade-side disc portion 31 has a drain 33 for discharging rainwater and the like remaining on the surface on the rotor head 4 side toward the tip of the wind-turbine rotor blade 6. The drain 33 has a cylindrical backflow preventing portion 34 extending from the blade-side disc portion 31 toward the tip of the wind-turbine rotor blade 6.

The blade-side disc portion 31 is disposed on the wind-turbine rotor blade 6, in a region near the rotor head 4 and at a position facing the capsule-side waterproof portion 21.

An example of the power generating unit 7 is, for example, as shown in FIG. 1, one having a generator to which the rotational driving force of the rotor head 4 is transmitted so that power is generated, and a transformer for converting power generated by the generator into alternating-current power having a predetermined frequency (for example, alternating-current power of 50 Hz or 60 Hz).

An overview of a method for generating power using the wind turbine generator 1 having the above-described structure will be described next.

In the wind turbine generator 1, the force of the wind blowing in the rotation axis direction of the rotor head 4 against the wind-turbine rotor blades 6 is converted into motive power for rotating the rotor head 4 about the rotation axis.

The rotation of the rotor head 4 is transmitted to the power generating unit 7, where electric power suitable for an object to be supplied with electric power, for example, alternating-current power having a frequency of 50 Hz or 60 Hz, is generated.

At least during power generation, to allow the force of the wind to effectively act on the wind-turbine rotor blades, the nacelle 3 is appropriately rotated in the horizontal plane to make the rotor head 4 face the wind.

The prevention of rainwater from penetrating into the head capsule, which is a feature of the present invention, will be described next.

First, the prevention of penetration of rainwater that runs down the wind-turbine rotor blade 6 from the wind-turbine rotor blade 6 toward the head capsule 5 into the head capsule 5 will be described.

When the wind-turbine rotor blade 6 extends upward, the rainwater deposited on the wind-turbine rotor blade 6 runs down the wind-turbine rotor blade 6 and drops toward the rotor head 4. As shown in FIG. 4, the rainwater running down the wind-turbine rotor blade 6 (flowing from bottom to top in FIG. 4) runs from the outer circumferential surface of the wind-turbine rotor blade 6 to the blade-side disc portion 31.

The rainwater having reached the outer surface of the blade-side disc portion 31 (the surface at the tip of the wind-turbine rotor blade 6) runs radially outward due to the inclination of the blade-side disc portion 31, and drops from the outer circumferential edge of the blade-side disc portion 31 toward the head capsule 5. Accordingly, rainwater is prevented from penetrating into the inside from the openings 11 in the head capsule 5.

Because the drain 33 has the backflow preventing portion 34, the rainwater running down the outer surface of the blade-side disc portion 31 does not run down from the drain 33 toward the rotor head 4.

The prevention of rainwater that runs down from the head capsule 5 toward the wind-turbine rotor blade 6 from entering the head capsule 5 will be described next.

When the wind-turbine rotor blade 6 extends downward, the rainwater deposited on the head capsule 5 runs down the head capsule 5 and drops toward the wind-turbine rotor blade 6. As shown in FIG. 4, the rainwater running down the head capsule 5 runs from the outer circumferential surface of the head capsule 5 to the outer circumferential surface of the cylindrical portion 22.

The rainwater having reached the outer circumferential surface of the cylindrical portion 22 runs down toward the tip of the wind-turbine rotor blade 6 and reaches the capsule-side disc portion 23. Due to the inclination of the capsule-side disc portion 23, the rainwater is temporarily trapped between the cylindrical portion 22 and the capsule-side disc portion 23, and then, drops from the outer circumferential edge of the capsule-side disc portion 23 toward the tip of the wind-turbine rotor blade 6. Accordingly, rainwater is prevented from penetrating into the inside from the openings 11 in the head capsule 5.

Furthermore, the prevention of rainwater that splashes from the head capsule 5 toward the wind-turbine rotor blade 6 from entering the head capsule 5 will be described.

When the wind-turbine rotor blade 6 extends downward and when the rainwater deposited on the head capsule 5 swiftly runs down, the rainwater splashes from the head capsule 5 toward the wind-turbine rotor blade 6.

Part of the splashed rainwater, which jumps into the gap between the blade-side disc portion 31 and the cylindrical portion 22, splashes along the above-mentioned tangent line TL. Because the outer circumferential edge of the bent portion 24 extends, at least, to the tangent line TL, the rainwater splashing along the tangent line TL collides with the bent portion 24.

The rainwater having collided with the bent portion 24 runs down the bent portion 24 and drops from the outer circumferential edge toward the tip of the wind-turbine rotor blade 6. Accordingly, rainwater is prevented from penetrating into the inside from the openings 11 in the head capsule 5.

The rainwater penetrated toward the wind-turbine rotor blade 6 from the gap between the cylindrical portion 22, capsule-side disc portion 23 and the blade-side disc portion 31 drops toward the tip of the wind-turbine rotor blade 6 from the drain 33 in the blade-side disc portion 31, when the wind-turbine rotor blade 6 extends downward.

In the above-described structure, the rainwater running down the wind-turbine rotor blade 6 from the wind-turbine rotor blade 6 to the head capsule 5 runs from the wind-turbine rotor blade 6 along the blade-side disc portion 31 and drops on the head capsule 5 via the blade-side disc portion 31. At this time, because the blade-side disc portion 31 is inclined toward the head capsule 5, the rainwater smoothly runs radially outward and drops on the head capsule 5.

Accordingly, rainwater is prevented from flowing into the gap between the wind-turbine rotor blade 6 and the head capsule 5, whereby failure of the rotor head 4 and the like due to rainwater is prevented.

On the other hand, the rainwater running down the head capsule 5 from the head capsule 5 to the wind-turbine rotor blade 6 runs from the head capsule 5 along the cylindrical portion 22 and the capsule-side disc portion 23 and drops on the outside of the blade-side disc portion 31.

The rainwater remaining between the head capsule 5 and the capsule-side disc portion 23 at this time runs down the head capsule 5 from the cylindrical portion 22 when the head capsule 5 is rotated to reverse the top and bottom.

Accordingly, rainwater is prevented from flowing into the gap between the wind-turbine rotor blade 6 and the head capsule 5 and from causing failure of the rotor head 4 and the like.

Furthermore, the rainwater splashed from the head capsule 5 toward the gap between the blade-side disc portion 31 and the capsule-side disc portion 23 collides with the bent portion 24, runs along the bent portion 24, and drops on the outside of the blade-side disc portion 31. Because the bent portion 24 extends radially outward further than the blade-side disc portion 31, the rainwater is more reliably guided to the outside of the blade-side disc portion 31.

Accordingly, rainwater is prevented from flowing into the gap between the wind-turbine rotor blade 6 and the head capsule 5 and from causing failure of the rotor head 4 and the like.

The invention claimed is:

1. A wind turbine generator comprising:

a plurality of wind-turbine rotor blades for receiving wind power;

a rotor head to which the plurality of wind-turbine rotor blades are attached, the rotor head being rotated and driven by the wind power received by the plurality of wind-turbine rotor blades;

a head capsule for covering the rotor head;

a blade-side disc portion that extends radially outward of each wind-turbine rotor blade from the wind-turbine rotor blade and is inclined toward the head capsule;

a cylindrical portion that is disposed substantially coaxial with each wind-turbine rotor blade and extends from the head capsule toward the tip of the wind-turbine rotor blade;

a capsule-side disc portion extending from each cylindrical portion radially outward of the wind-turbine rotor blade; and a bent portion that extends radially outward from the outer circumferential edge of each capsule-side disc portion and is inclined toward the tip of the wind-turbine rotor blade.

2. The wind turbine generator according to claim 1, wherein each capsule-side disc portion extends radially outward from the blade-side disc portion and is inclined toward the head capsule.

3. The wind turbine generator according to claim 1, wherein each bent portion extends, at least, to a position where it abuts a tangent line extending from the head capsule to a gap between the blade-side disc portion and the capsule-side disc portion.

4. The wind power generator according to claim 2, wherein each bent portion extends, at least to a position where it abuts a tangent line extending from the head capsule to a gap between the blade-side disc portion and the capsule-side disc portion.

* * * * *